(12) United States Patent
Du et al.

(10) Patent No.: US 12,429,736 B2
(45) Date of Patent: Sep. 30, 2025

(54) DISPLAY SUBSTRATE AND DISPLAY DEVICE

(71) Applicants: HEFEI XINSHENG OPTOELECTRONICS TECHNOLOGY CO., LTD., Hefei (CN); BOE TECHNOLOGY GROUP CO., LTD., Beijing (CN)

(72) Inventors: Ruifang Du, Beijing (CN); Haijiao Qian, Beijing (CN); Xiaoye Ma, Beijing (CN); Yong Qi, Beijing (CN); Hui Guo, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/703,515

(22) PCT Filed: Apr. 26, 2023

(86) PCT No.: PCT/CN2023/090813
§ 371 (c)(1),
(2) Date: Apr. 22, 2024

(87) PCT Pub. No.: WO2023/231652
PCT Pub. Date: Dec. 7, 2023

(65) Prior Publication Data
US 2025/0237908 A1 Jul. 24, 2025

(30) Foreign Application Priority Data
May 30, 2022 (CN) .................... 202210598554.0

(51) Int. Cl.
*G02F 1/1339* (2006.01)
*G02F 1/1333* (2006.01)
(Continued)

(52) U.S. Cl.
CPC ...... *G02F 1/1339* (2013.01); *G02F 1/133308* (2013.01); *G02F 1/133514* (2013.01); *G02F 1/136286* (2013.01)

(58) Field of Classification Search
CPC ............. G02F 1/1339; G02F 1/133308; G02F 1/133514; G02F 1/136286
See application file for complete search history.

(56) References Cited

U.S. PATENT DOCUMENTS

2021/0223588 A1* 7/2021 Ma .................. G02F 1/1339

FOREIGN PATENT DOCUMENTS

| CN | 105589264 A | 5/2016 |
|---|---|---|
| CN | 205920296 U | 2/2017 |

(Continued)

*Primary Examiner* — James R Greece
*Assistant Examiner* — Jose M Diaz
(74) *Attorney, Agent, or Firm* — WHDA, LLP

(57) ABSTRACT

The present disclosure provides a display substrate and a display device. The display substrate comprises: a display area and a frame area located at the periphery of the display area, wherein the frame area comprises a frame sealant arrangement area, and the frame sealant arrangement area comprises a corner area; the display substrate further comprising: an organic film layer, wherein the organic film layer comprises an annular groove and at least one arc-shaped groove, the annular groove surrounds the display area, and the annular groove is located in the frame sealant arrangement area; the arc-shaped groove is located in the corner area.

15 Claims, 6 Drawing Sheets

(51) Int. Cl.
  *G02F 1/1335* (2006.01)
  *G02F 1/1362* (2006.01)

(56) References Cited

FOREIGN PATENT DOCUMENTS

| | | |
|---|---|---|
| CN | 110824785 A | 2/2020 |
| CN | 111244039 A | 6/2020 |
| CN | 111258125 A | 6/2020 |
| CN | 212112068 U | 12/2020 |
| CN | 113534551 A | 10/2021 |
| CN | 114994988 A | 9/2022 |
| WO | 2021/120216 A1 | 6/2021 |

\* cited by examiner

DISPLAY SUBSTRATE AND DISPLAY DEVICE

CROSS-REFERENCE TO RELATED APPLICATIONS

This application is the U.S. national phase of PCT Application No. PCT/CN2023/090813 filed on Apr. 26, 2023, which claims priority to Chinese Patent Application No. 202210598554.0 filed in China on May 30, 2022, the entire contents of which are hereby incorporated by reference.

TECHNICAL FIELD

The present disclosure relates to the technical field of display, and more particularly, to a display substrate and a display device.

BACKGROUND

As customer demand continues to increase, the resolution and refresh frequency of existing display products are increasing. Such display products require the use of an organic film layer in the manufacturing process; however, due to the determination of the nature of the organic film layer itself, the organic film layer is easy to provide a path for the transmission of water vapor and oxygen, and the connection between the organic film layer and other film layers is not tight enough, resulting in a relatively high risk of reliability evaluation (especially evaluation in a high temperature, high pressure and high humidity environment) and testing of the display product, so the design of the organic film layer needs to be carefully considered.

SUMMARY

It is an object of the present disclosure to provide a display substrate and a display device.

In order to achieve the above object, the present disclosure provides the following technical solutions.

In a first aspect of the present disclosure, a display substrate is provided, comprising: a display area and a frame area located at the periphery of the display area, wherein the frame area comprises a frame sealant arrangement area, and the frame sealant arrangement area comprises a corner area; the display substrate further comprising:
  an organic film layer, wherein the organic film layer comprises an annular groove and at least one arc-shaped groove, the annular groove surrounds the display area, and the annular groove is located in the frame sealant arrangement area; the arc-shaped groove is located in the corner area.

Optionally, the at least one arc-shaped groove is located between the annular groove and the display area.

Optionally, the organic film layer comprises a plurality of arc-shaped grooves, the plurality of arc-shaped grooves are divided into a plurality of groups of arc-shaped grooves, each group of arc-shaped grooves comprises at least two arc-shaped grooves, and the at least two arc-shaped grooves are sequentially arranged in a direction close to the display area; the plurality groups of arc-shaped groove groups are located in a plurality of corner areas comprised in the frame sealant arrangement area on a one-to-one basis.

Optionally, the organic film layer is located away from a boundary of the display area, and is located between a boundary of the frame sealant arrangement area away from the display area and the display area.

Optionally, a first distance is provided between an orthographic projection of a boundary of the organic film layer away from the display area on a base substrate of the display substrate and an orthographic projection of a boundary of the frame sealant arrangement area away from the display area on the base substrate of the display substrate, wherein the first distance d1 satisfies: d1=10%*d2±0.1, and d2 is the width of the frame sealant arrangement area.

Optionally, the display substrate further comprises a ground line located in the frame area, and the ground line surrounds the display area;
  an orthographic projection of the ground line on the base substrate of the display substrate at least partially overlaps with an orthographic projection of the annular groove on the base substrate; and/or,
  an orthographic projection of the ground line on the base substrate of the display substrate at least partially overlaps with an orthographic projection of the arc-shaped groove on the base substrate.

Optionally, an orthographic projection of the ground line on the base substrate of the display substrate at least partially overlaps with an orthographic projection of at least one end of the arc-shaped groove on the base substrate.

Optionally, the display substrate further comprises a common signal line located in the frame area, wherein an orthographic projection of the common signal line on the base substrate is located between the orthographic projection of the ground line on the base substrate and the display area;
  an orthographic projection of the common signal line on the base substrate does not overlap with the orthographic projection of the annular groove on the base substrate; and/or the orthographic projection of the common signal line on the base substrate at least partially overlaps with an orthographic projection of an end of the arc-shaped groove on the base substrate.

Optionally, at least a portion of the orthographic projection of the common signal line on the base substrate is between orthographic projections of adjacent arc-shaped grooves on the base substrate.

Optionally, the display substrate further comprises a data line testing circuit located in the frame area, and a plurality of data testing lines respectively connected to the data line testing circuit; and
  an orthographic projection of the data testing line on the base substrate of the display substrate at least partially overlaps with the orthographic projection of the annular groove on the base substrate.

Optionally, the orthographic projection of the data testing line on the base substrate of the display substrate at least partially overlaps with the orthographic projection of the arc-shaped groove on the base substrate.

Optionally, the display substrate further comprises a gate electrode driving circuit located in the frame area, and pulse signal lines respectively coupled to the gate electrode driving circuit;
  an orthographic projection of the pulse signal line on the base substrate of the display substrate does not overlap with the orthographic projection of the annular groove on the base substrate; and/or the orthographic projection of the pulse signal line on the base substrate of the display substrate does not overlap with the orthographic projection of the arc-shaped groove on the base substrate.

Optionally, the display substrate further comprises a data line layer, a first passivation layer, a first electrode layer and a second passivation layer which are successively stacked in a direction away from the base substrate of the display substrate, and the organic film layer is located between the first passivation layer and the first electrode layer.

Based on the above-mentioned technical solution of the display substrate, a second aspect of the present disclosure provides a display device comprising the above-mentioned display substrate.

Optionally, the display device further comprises a color film substrate and a sealant, wherein the color film substrate is arranged opposite to the display substrate, and the sealant is located between the color film substrate and the display substrate and is located in the frame sealant arrangement area of the display substrate.

BRIEF DESCRIPTION OF THE DRAWINGS

The accompanying drawings, which are included to provide a further understanding of the present disclosure and are incorporated in and constitute a part of the present disclosure, illustrate embodiment(s) of the present disclosure and together with the description serve to explain the disclosure and do not constitute an undue limitation of the disclosure. In the drawings.

DETAILED DESCRIPTION

Figure 1:
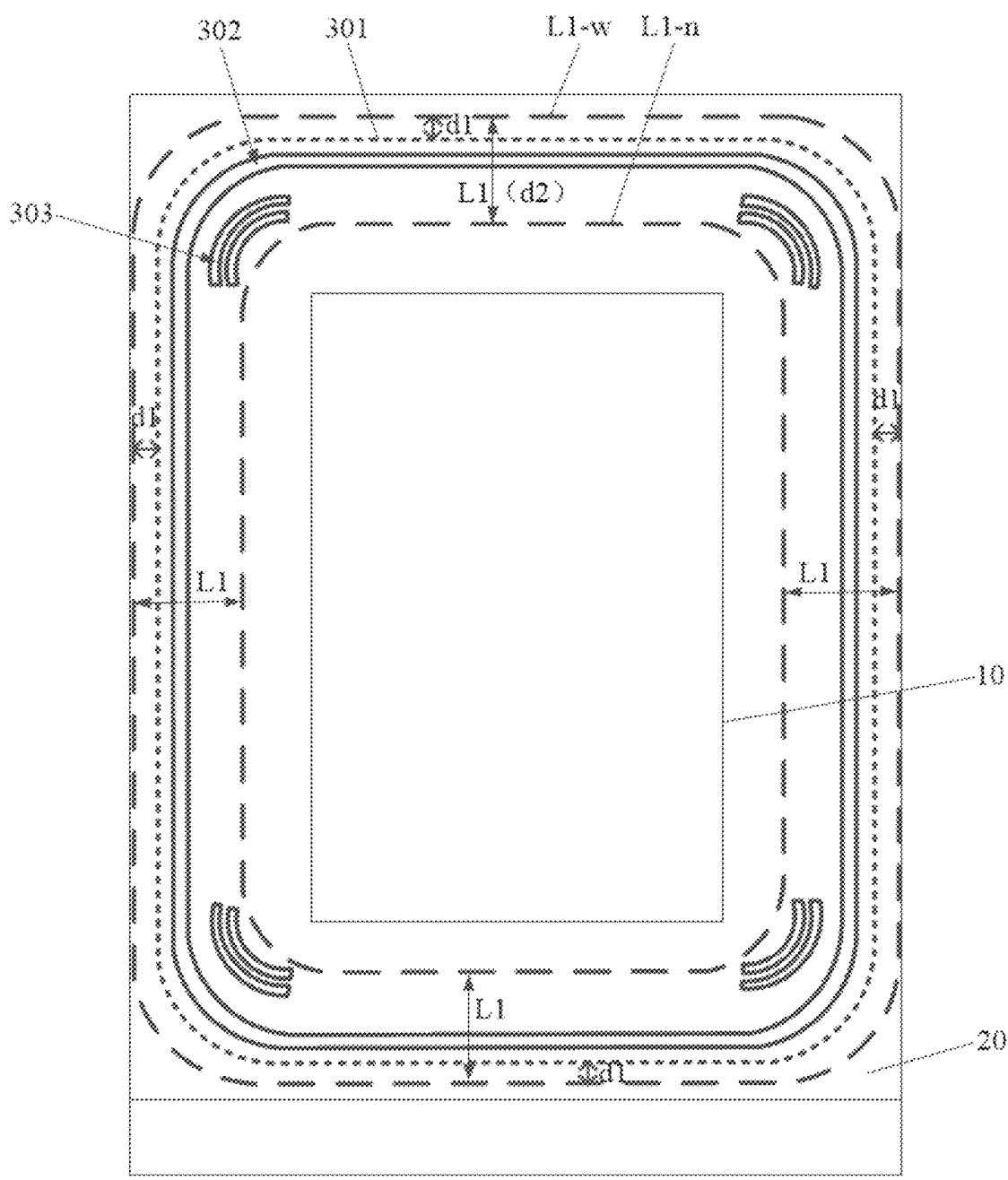
FIG. 1 is a schematic top view of a display substrate provided by an embodiment of the present disclosure.

In order to further explain the display substrate and the display device provided by the embodiments of the present disclosure, a detailed description will be given below with reference to the accompanying drawings.

In the related art display products, the organic film layer easily provides a path for water vapor and oxygen transmission, and the connection tightness between the organic film layer and other film layers is insufficient, resulting in a problem that the reliability evaluation and test risk of the display product is relatively high.

Referring to FIGS. 1, 2, 4, 6, 8 and 10, an embodiment of the present disclosure provides a display substrate comprising: a display area 10 and a frame area 20 located at the periphery of the display area 10, wherein the frame area 20 comprises a frame sealant arrangement area L1, and the frame sealant arrangement area L1 comprises a corner area; the display substrate further comprises:

an organic film layer 30, wherein the organic film layer 30 comprises an annular groove 302 and at least one arc-shaped groove 303, the annular groove 302 surrounds the display area 10, and the annular groove 302 is located in the frame sealant arrangement area L1; the arc-shaped grooves 303 are located in the corner areas.

Figure 4:
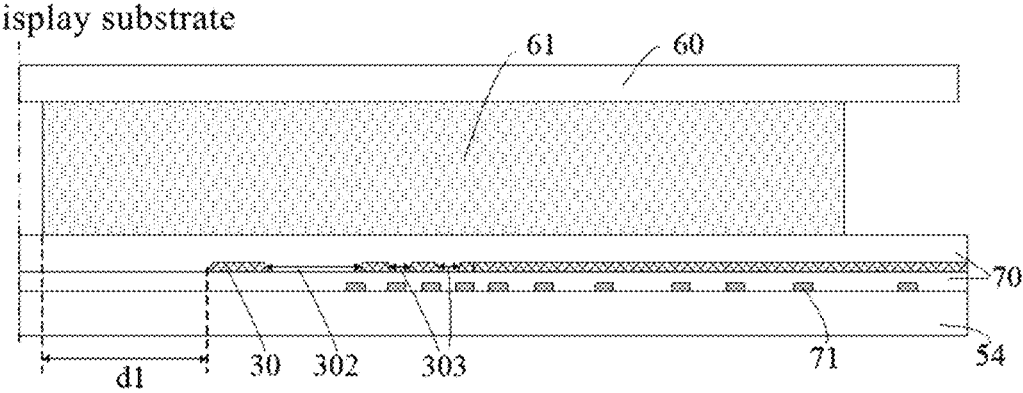
FIG. 4 is a schematic cross-sectional view of a display device at a corner provided by an embodiment of the present disclosure.
Figure 5:
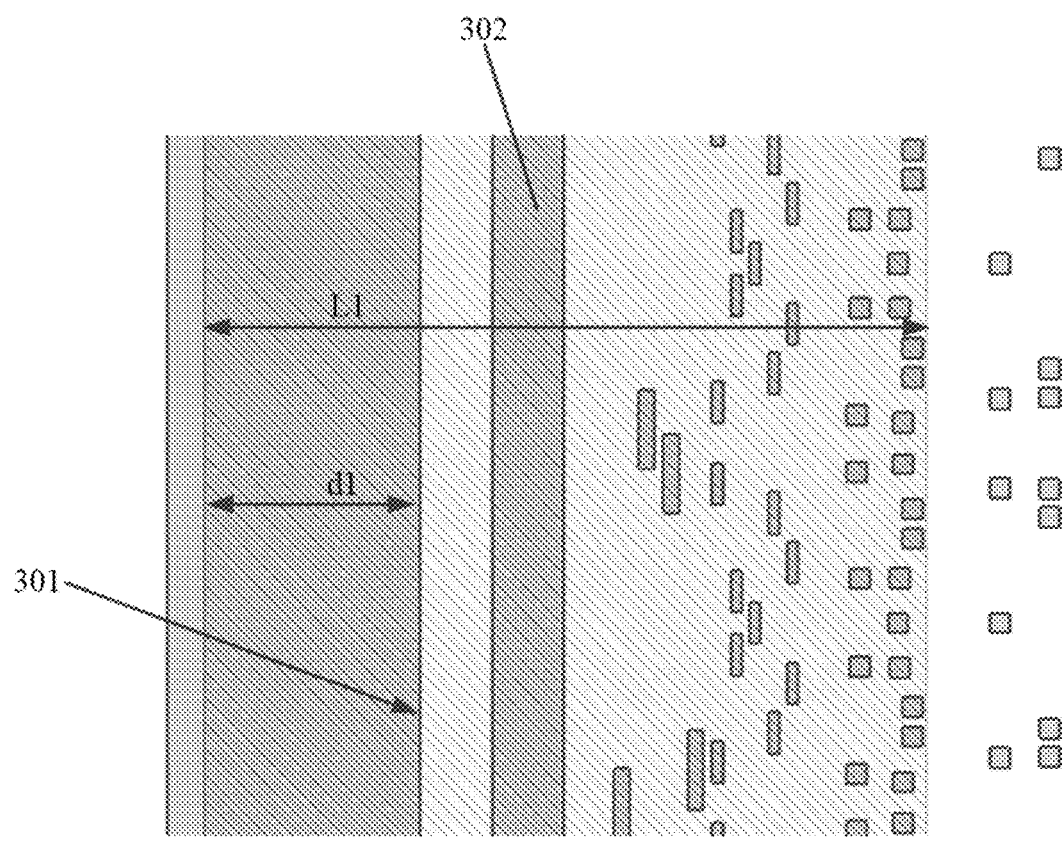
FIG. 5 is a schematic view of an organic film layer and a frame sealant arrangement area at a left border of a display substrate provided by an embodiment of the present disclosure.
Figure 6:
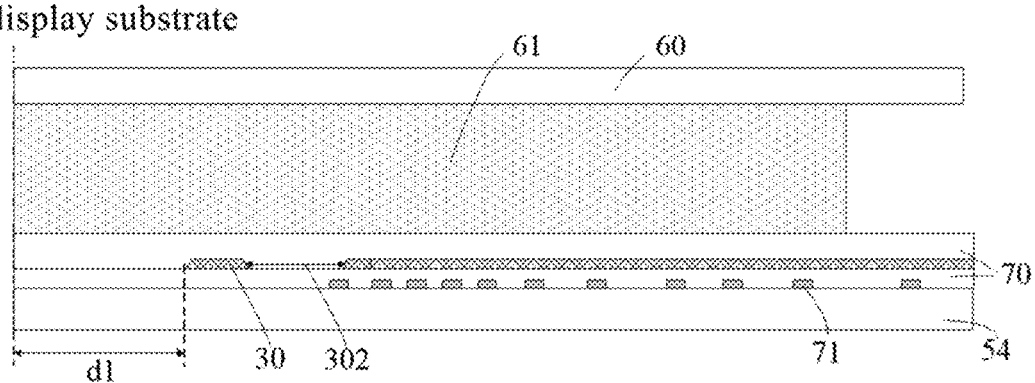
FIG. 6 is a schematic cross-sectional view at the left border of a display device provided by an embodiment of the present disclosure.
Figure 7:
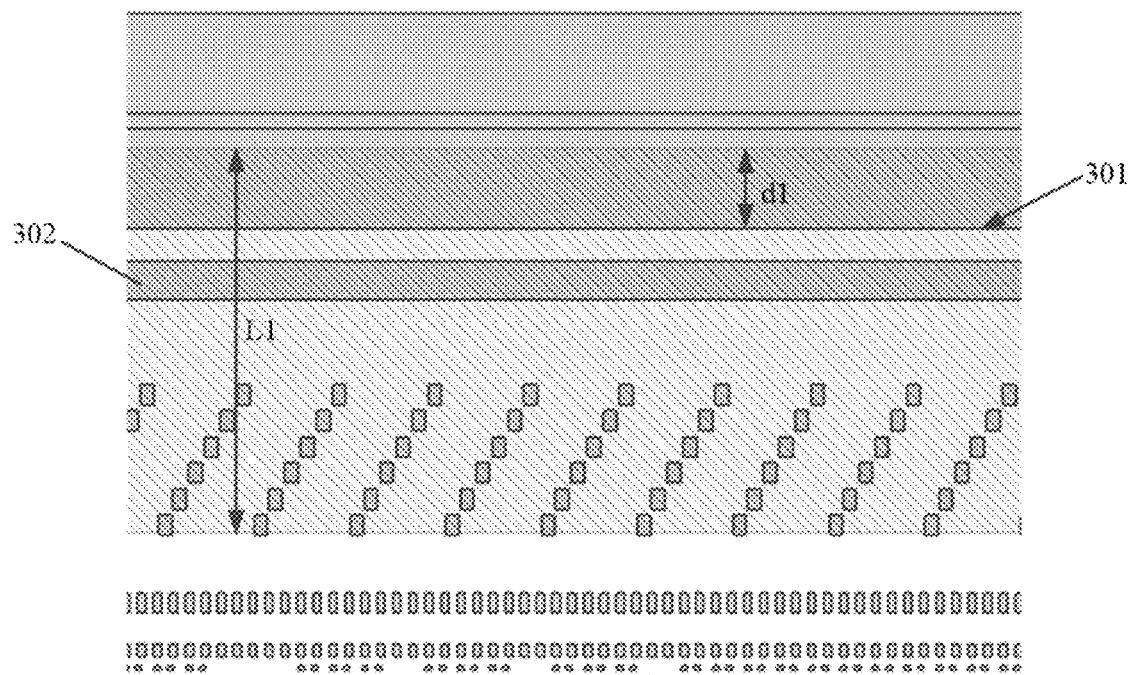
FIG. 7 is a schematic view of an organic film layer and a frame sealant arrangement area at an upper border of a display substrate provided by an embodiment of the present disclosure.
Figure 8:
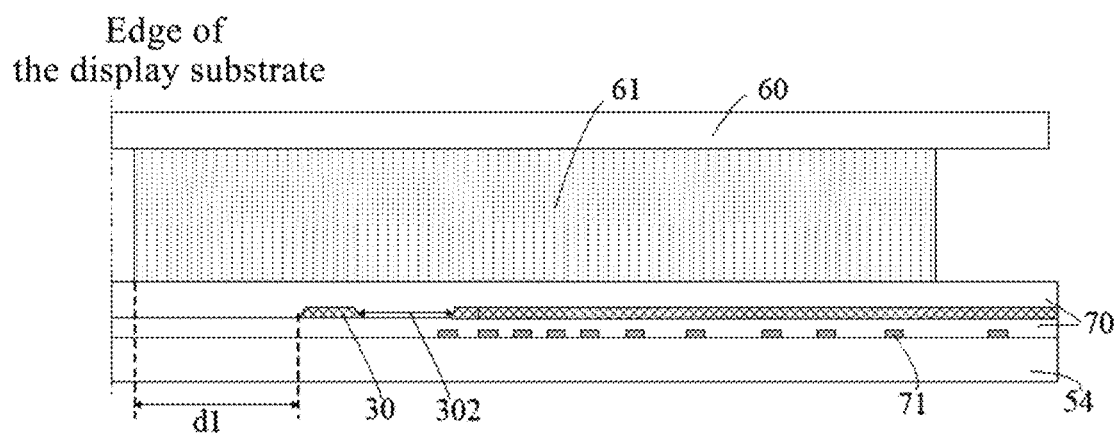
FIG. 8 is a schematic cross-sectional view of a display device at an upper border provided by an embodiment of the present disclosure.

Notably, insulating layer 70 and gate metal layer 71 are also illustrated in FIGS. 4, 6 and 8.

Illustratively, the display substrate includes the display area 10 and the frame area 20 that surrounds the display area 10. The frame area 20 comprises a frame sealant arrangement area L1, and the frame sealant arrangement area L1 surrounds the display area 10. The frame sealant arrangement area L1 comprises a plurality of corner areas, and the plurality of corner areas correspond to a plurality of corners comprised by the display area 10 substrate on a one-to-one basis. By way of example, the display substrate comprises a rectangular display substrate, and the sealant L1 comprises four corner areas corresponding to four corners of the rectangular display substrate on a one-to-one basis.

As an example, the frame sealant arrangement area L1 is used for setting a sealant 61 capable of bonding the display substrate to an opposing substrate.

Illustratively, the organic film layer 30 is made of an organic material, including a polymer resin, and the main chemical elements are carbon, hydrogen, and oxygen.

Illustratively, the organic film layer 30 includes an annular groove 302 and at least one arc-shaped groove 303, both of which extend through the organic film layer 30 in a direction perpendicular to the base substrate of the display substrate.

By way of example, after the frame sealant arrangement area L1 forms the frame sealant 61, the frame sealant 61 can completely cover the annular groove 302 and the arc-shaped groove 303. The sealant 61 can completely cover the cross sections of the organic film layer 30 formed at the annular groove 302 and the arc-shaped groove 303, where the cross sections refer to the cross sections along the direction perpendicular to the display substrate.

According to the above-mentioned specific structure of the display substrate, it can be seen that in the display substrate provided by the embodiments of the present disclosure, by providing that the organic film layer 30 comprises the annular groove 302, so that the part of the organic film layer 30 located between the annular groove 302 and the display area 10 can be separated from the part of the organic film layer 30 located at the side of the annular groove 302 away from the display area 10, in this way, the transmission of external water vapor and oxygen to the interior of the display substrate via the organic film layer 30 as a transmission path is avoided, thereby effectively improving the reliability and service life of the display substrate.

Embodiments of the present disclosure provide a display substrate in which the risk of water vapor and oxygen intrusion into the interior of the display substrate along the organic film layer 30 at the corner area is further reduced by providing the organic film layer 30 to include the arc-shaped grooves 303 at the corner area, overcoming the problem that the water vapor and oxygen intrusion resistance of the corner area of the display substrate is weak.

In the display substrate provided by the embodiments of the present disclosure, by arranging that the organic film layer 30 comprises the annular groove 302 and the arc-shaped groove 303, the inorganic layers located on both sides of the organic film layer 30 in the direction perpendicular to the base substrate can be contacted at the annular groove 302, and likewise, the inorganic layers located on both sides of the organic film layer 30 in the direction perpendicular to the base substrate can be contacted at the arc-shaped groove 303, the contact interface formed between the two inorganic layers being closer than the contact interface formed between the inorganic layers and the organic film layer 30, thus, the problem of relatively high reliability evaluation and test risk of the display substrate is solved.

In the display substrate provided by the embodiments of the present disclosure, the annular groove 302 and the arc-shaped groove 303 are arranged in the frame sealant arrangement area L1, so that both the annular groove 302 and the arc-shaped groove 303 can be covered by the sealant 61 subsequently formed on the display substrate, and double protection is realized, which better solves the problem of relatively high risk of reliability evaluation and testing of the display substrate. Furthermore, the provision of the sealant 61 can completely cover the annular groove 302 and the arc-shaped groove 303, and can increase the contact area between the sealant 61 and the display substrate, so that the sealant 61 is more tightly bonded to the display substrate.

Figure 2:
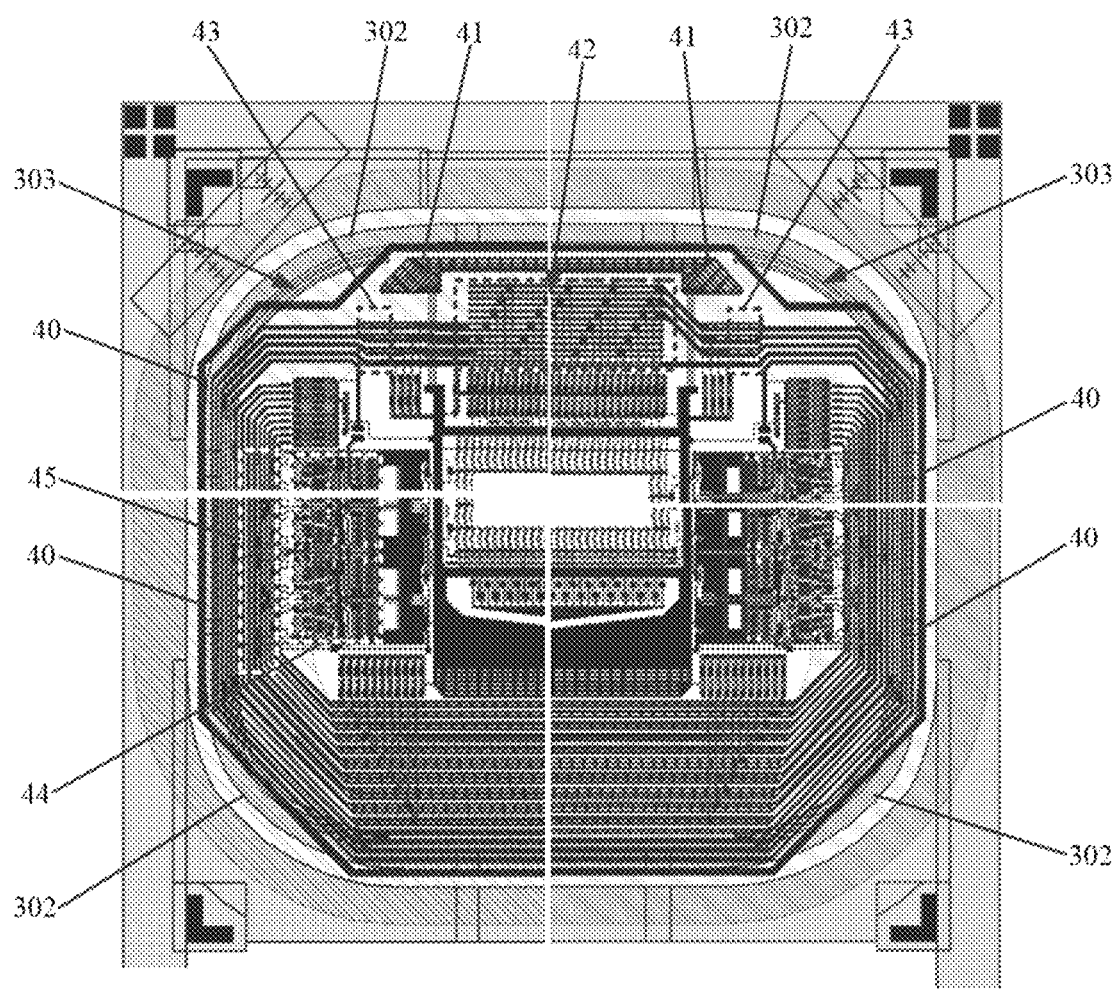
FIG. 2 is a schematic layout diagram of four corners of a display substrate provided by an embodiment of the present disclosure.
Figure 3:
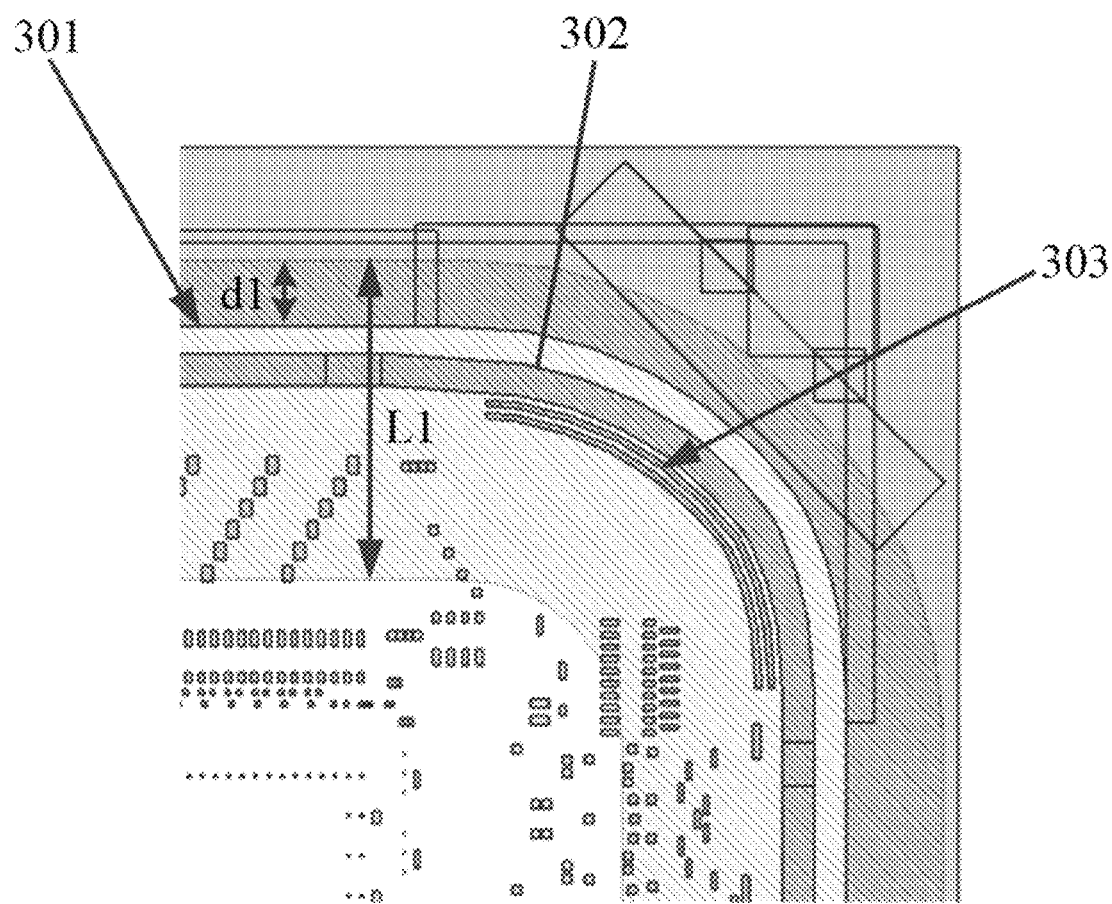
FIG. 3 is a schematic view of an organic film layer and a frame sealant arrangement area at one corner in a display substrate provided by an embodiment of the present disclosure.

As shown in FIGS. 1 and 2, in some embodiments, the at least one arc-shaped groove 303 is located between the annular groove 302 and the display area 10.

The provision of the arc-shaped groove 303 between the annular groove 302 and the display area 10 enables the annular groove 302 to be located as far away from the display area 10 as possible and to isolate water vapor and oxygen from the display area 10 earlier.

As shown in FIGS. 1 to 8, in some embodiments, the organic film layer 30 comprises a plurality of arc-shaped grooves 303, the plurality of arc-shaped grooves 303 are divided into a plurality of arc-shaped groove groups, each arc-shaped groove group comprises at least two arc-shaped grooves 303, and the at least two arc-shaped grooves 303 are sequentially arranged in a direction close to the display area 10; the plurality groups of arc-shaped groove groups are located in a plurality of corner areas comprised in the frame sealant arrangement area L1 in a one-to-one correspondence.

Illustratively, one arc-shaped groove group is provided in each corner area, and each arc-shaped groove group comprises at least two arc-shaped grooves 303 sequentially arranged in a direction close to the display area 10.

The above-described embodiment provides a display substrate in which the risk of water vapor and oxygen intrusion into the interior of the display substrate along the organic film layer 30 in each corner area is further reduced by providing at least two arc-shaped grooves 303 in the corner area, overcoming the problem that the corner area of the display substrate is weak in resistance to water vapor and oxygen intrusion. Furthermore, the arc-shaped groove 303 may be arranged at a relatively large distance from the active electrode comprised by the display substrate, so that the arc-shaped groove 303 enables a better protection of the via to which the active electrode is connected.

As shown in FIG. 1, in some embodiments, the boundary 301 of the organic film layer 30 away from the display area 10 is located between the boundary L1-w of the frame sealant arrangement area L1 away from the display area 10 and the display area 10. Also illustrated in FIG. 1 are the boundary L1-n of the frame sealant arrangement area L1 near the display area 10.

Illustratively, the organic film layer 30 in the display substrate on the side of the frame sealant arrangement area L1 away from the display area 10 is entirely removed. Note that since the contact between the organic film layer 30 and the adjacent inorganic layer is not tight, water vapor is easily introduced, the organic film layer 30 can be removed as much as the width of the border allows, so that the organic film layer 30 is further away from the boundary of the display area 10 from the edge of the display substrate, and is more resistant to the high temperature, high pressure and high humidity environment for reliability evaluation.

As shown in FIG. 1, by way of example, the first distance can be enlarged as much as possible while ensuring that the cross-section of the organic film layer 30 away from the display area 10 can be completely covered by the frame sealant subsequently formed on the display substrate. The first distance d1 refers to: the distance between the orthographic projection of the boundary of the organic film layer 30 away from the display area 10 on the base substrate of the display substrate and the orthographic projection of the boundary of the frame sealant arrangement area L1 away from the display area 10 on the base substrate of the display substrate.

In the display substrate provided in the above-mentioned embodiment, by arranging the organic film layer 30 away from the boundary of the display area 10 and between the boundary of the frame sealant arrangement area L1 away from the display area 10 and the display area 10, the cross section of the organic film layer 30 away from the display area 10 can be completely covered by the sealant subsequently formed on the display substrate, reducing the risk of water vapor and oxygen intrusion from the outside to the organic film layer 30, and better improving the quality and competitiveness of the display product.

As shown in FIGS. 1 and 3 to 8, in some embodiments, there is a first distance between the orthographic projection of the organic film layer 30 on the base substrate of the display substrate away from the boundary of the display area 10 and the orthographic projection of the frame sealant arrangement area L1 on the base substrate of the display substrate away from the boundary of the display area 10, wherein the first distance d1 satisfies: $d1=10\%*d2\pm0.1$, and d2 is the width of the frame sealant arrangement area L1. The first distances d1 and d2 are both in mm.

Note that, in order to ensure that the cross section of the organic film layer 30 away from the display area 10 can be completely covered by the frame sealant subsequently formed on the display substrate, it is necessary to consider the coating accuracy and the position accuracy of the frame sealant, wherein the coating accuracy of the frame sealant is $10\%\times d2$, and the position accuracy is $\pm0.1$ mm.

Setting the first distance d1 to satisfy: $d1=10\%*d2\pm0.1$, and it can be ensured that a cross section of the organic film layer 30 away from the display area 10 can be completely covered by a frame sealant subsequently formed on a display substrate.

As shown in FIG. 2, in some embodiments, the display substrate further comprises a ground line 40 located at the frame area 20, the ground line 40 surrounding the display area 10;

an orthographic projection of the ground line 40 on a base substrate of the display substrate at least partially overlaps with an orthographic projection of the annular groove 302 on the base substrate; and/or the front projection of the ground line 40 on the base substrate of the display substrate at least partially overlaps with the front projection of the arc-shaped groove 303 on the base substrate.

Illustratively, the ground line 40 is used to transmit a GND signal, the GND signal being a stable voltage signal. The current on the ground line 40 is small, and alternatively, the ground line may be connected to the ground signal terminal of the circuit board or the driving chip at the binding region lead-out pin of the non-display area of the display panel.

Illustratively, the orthographic projection of a portion of the ground line 40 on the base substrate of the display substrate overlaps the orthographic projection of the annular groove 302 on the base substrate.

Illustratively, the orthographic projection of a portion of the ground line 40 on the base substrate of the display substrate is between the orthographic projection of the annular groove 302 on the base substrate and the display area 10.

In some embodiments, an orthographic projection of the ground line 40 on a base substrate of the display substrate at least partially overlaps with an orthographic projection of at least one end of the arc-shaped groove 303 on the base substrate.

In the display substrate provided in the above-mentioned embodiment, by arranging the ground line 40 with a stable voltage signal to overlap the annular groove 302 and the arc-shaped groove 303, it is not only possible to make full use of the layout space of the frame area 20, facilitating the display substrate to achieve a narrow frame, but also not enhancing the water vapor and oxygen transmission performance of the organic film layer 30.

As shown in FIG. 2, in some embodiments, the display substrate further comprises a common signal line 41 located at the frame area 20, an orthographic projection of the common signal line 41 on the base substrate is located between the orthographic projection of the ground line 40 on the base substrate and the display area 10;

the orthographic projection of the common signal line 41 on the base substrate does not overlap with the orthographic projection of the annular groove 302 on the base substrate; and/or the orthographic projection of the common signal line 41 on the base substrate at least partially overlaps with the orthographic projection of the end of the arc-shaped groove 303 on the base substrate.

Illustratively, the common signal line 41 is used to transmit a common signal, which is a stable voltage signal. The current on the common signal line 41 is small.

Illustratively, at least a portion of the common signal line 41 is located at an upper border of the display substrate. Illustratively, the orthographic projection of the common signal line 41 on the base substrate is between the orthographic projection of the annular groove 302 on the base substrate and the display area 10.

In some embodiments, at least a portion of the orthographic projection of the common signal line 41 on the base substrate is between the orthographic projection of adjacent arc-shaped grooves 303 on the base substrate.

In some embodiments, the orthographic projection of the common signal line 41 on the base substrate does not overlap the orthographic projection of the arc-shaped groove 303 on the base substrate.

The above-described embodiment provides a display substrate in which the common signal lines 41 having the stable voltage signals are arranged in the above-described manner, which not only makes full use of the layout space of the frame area 20, facilitates the display substrate to achieve a narrow rim, but also does not enhance the transmission performance of the organic film layer 30 to water vapor and oxygen.

Figure 9:
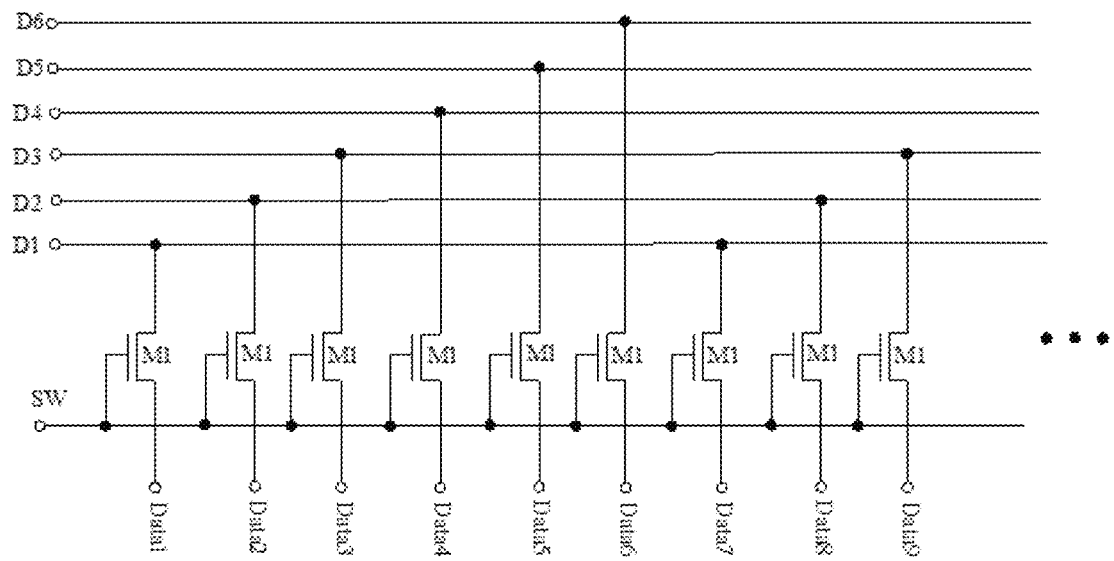
FIG. 9 is a circuit configuration diagram of a data line testing circuit provided in an embodiment of the present disclosure.

As shown in FIGS. 2 and 9, in some embodiments, the display substrate further comprises a data line testing circuit 42 located in the frame area 20, and a plurality of data testing lines 43 (comprising a test control line SW, and testing lines D1-D6) respectively connected to the data line testing circuit 42; optionally, the testing circuit can be used for illuminating a display panel for testing, and after the display panel is illuminated normally, an IC driving circuit is bound, etc. so as to avoid the waste of the driving circuit caused by a display abnormality;

the orthographic projection of the data testing line 43 on the base substrate of the display substrate at least partially overlaps the orthographic projection of the annular groove 302 on the base substrate.

By way of example, the data line testing circuit 42 comprises a plurality of test transistors M1, a control end of the test transistor M1 is coupled to a test control line SW, an output end of the test transistor M1 is coupled to one of the corresponding testing lines D1-D6, and in the process of testing, the test control line SW accesses a VGH signal, the test transistors M1 are all conductive, and an input end of the test transistor M1 accesses a data signal for testing, such as: Data1-Data9 for inputting data signals for testing to data lines in a display substrate via testing lines D1-D6; in subsequent normal use, the test control line SW is connected to the VGL signal, the test transistor M1 is completely turned off, and the testing lines D1-D6 are all connected to the GND signal.

As shown in FIG. 2, data testing lines 43, and testing lines D1-D3 are illustratively located on the left side of the display substrate, and testing lines D4-D6 are illustratively located on the right side of the display substrate, but are not limited thereto.

As shown in FIGS. 2 and 9, in some embodiments, the orthographic projection of the data testing line 43 on the base substrate of the display substrate at least partially overlaps the orthographic projection of the arc-shaped groove 303 on the base substrate.

In the display substrate provided in the above-mentioned embodiment, since the signals accessed by the data testing line 43 during subsequent normal use of the display substrate are all signals having a stable potential, the transmission performance of the organic film layer 30 to water vapor and oxygen is not enhanced. At least partially overlapping the orthographic projection of the annular groove 302 on the base substrate by arranging the orthographic projection of the data testing line 43 on the base substrate of the display substrate; and/or the orthographic projection of the data testing line 43 on the base substrate of the display substrate at least partially overlaps with the orthographic projection of the arc-shaped groove 303 on the base substrate, so that the layout space of the frame area of the display substrate can be effectively used, and the narrow frame of the display substrate can be advantageously achieved.

As shown in FIGS. 1 and 2, in some embodiments, the display substrate further comprises a gate electrode driving circuit 44 located in the frame area 20, and pulse signal lines 45 respectively coupled to the gate electrode driving circuit 44;

the orthographic projection of the pulse signal line 45 on a base substrate of the display substrate does not overlap with the orthographic projection of the annular groove 302 on the base substrate; and/or the orthographic projection of the pulse signal line 45 on the base substrate of the display substrate does not overlap with the front projection of the arc-shaped groove 303 on the base substrate.

The signal transmitted by the pulse signal line 45 is a pulse signal, there is a current flowing on the pulse signal line 45, and the pressure difference between the signal lines thereof is relatively large, namely, the surrounding electric field is relatively strong, which promotes the transmission of water vapor. Furthermore, the pulse signal line 45 needs to be connected to the shift register unit in the gate electrode driving circuit 44, and a transition pattern and a via hole need to be provided to realize the connection, and the transition pattern is generally made of a 2ITO film layer, and is easily corroded when encountering water vapor.

Illustratively, the pulse signal line 45 includes, but is not limited to, a frame start signal line, a clock signal, etc.

The display substrate provided in the above-mentioned embodiment does not overlap with the orthographic projection of the annular groove 302 on the base substrate by arranging the orthographic projection of the pulse signal line 45 on the base substrate of the display substrate; and/or the orthographic projection of the pulse signal line 45 on the base substrate of the display substrate does not overlap with the orthographic projection of the arc-shaped groove 303 on the base substrate; the transmission performance of the organic film layer 30 to water vapor and oxygen is not enhanced, and the probability that the pulse signal line 45 is corroded is also reduced.

Figure 10:
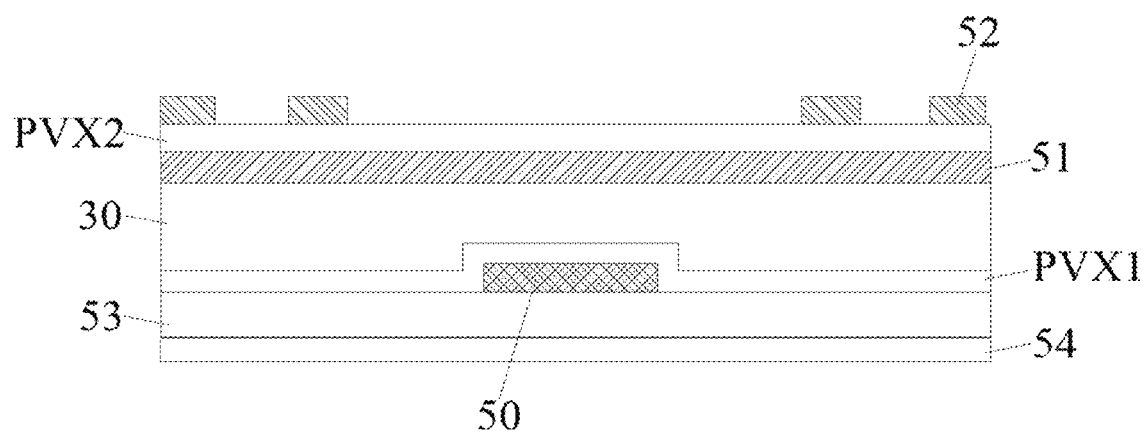
FIG. 10 is a schematic illustration of the position of an organic film layer in a display substrate provided by an embodiment of the present disclosure.

As shown in FIG. 10, in some embodiments, the display substrate further comprises a data line layer 50, a first passivation layer PVX1, a first electrode layer 51 and a second passivation layer PVX2 which are successively stacked in a direction away from a base substrate 54 of the display substrate, and the organic film layer 30 is located between the first passivation layer PVX1 and the first electrode layer 51.

Illustratively, as shown in FIG. 10, the display substrate further comprises a base film layer 53 provided between the base substrate 54 and the data line layer 50, and a second electrode layer 52 located on the side of the second passivation layer PVX2 facing away from the base substrate 54.

In the display substrate provided in the above-mentioned embodiment, by arranging the organic film layer 30 between the first passivation layer PVX1 and the first electrode layer 51, the distance between the data line layer 50 and the first electrode layer 51 is increased, and the capacitance between the data line layer 50 and the first electrode layer 51 is reduced, thereby reducing the loading of the data line layer 50.

As shown in FIG. 1, FIG. 2, FIG. 4, FIG. 6, and FIG. 8, embodiments of the present disclosure also provide a display device including the display substrate provided in the above embodiments.

It is to be noted that the display device may be: any product or component with a display function, such as a television, a display, a digital photo frame, a mobile phone, a tablet computer, and among others, the display device further includes a flexible circuit board, a printed circuit board and a back panel. The display device is not limited to oxide display products.

Illustratively, the display device includes, but is not limited to, a liquid crystal display device.

In the display substrate provided in the above-mentioned embodiment, by arranging that the organic film layer 30 comprises the annular groove 302 so that the portion of the organic film layer 30 located between the annular groove 302 and the display area 10 can be separated from the portion of the organic film layer 30 located on the side of the annular groove 302 away from the display area 10, moisture and oxygen from the outside are prevented from being transmitted to the inside of the display substrate by the organic film layer 30 as a transmission path, thereby effectively improving the reliability and service life of the display substrate.

In the display substrate provided in the above-mentioned embodiment, by providing that the organic film layer 30 comprises the arc-shaped grooves 303 at the corner areas, the risk of water vapor and oxygen intrusion along the organic film layer 30 into the interior of the display substrate at the corner areas is further reduced, and the problem that the water vapor and oxygen intrusion resistance of the corner areas of the display substrate is weak is overcome.

In the display substrate provided in the above-mentioned embodiment, by arranging that the organic film layer 30 comprises the annular groove 302 and the arc-shaped groove 303, the inorganic layers located on both sides of the organic film layer 30 in the direction perpendicular to the base substrate can be contacted at the annular groove 302, and likewise, the inorganic layers located on both sides of the organic film layer 30 in the direction perpendicular to the base substrate can be contacted at the arc-shaped groove 303, the contact interface formed between the two inorganic layers being closer than the contact interface formed between the inorganic layers and the organic film layer 30, thus, the problem of relatively high reliability evaluation and test risk of the display substrate is solved.

In the display substrate provided in the above-mentioned embodiment, the annular groove 302 and the arc-shaped groove 303 are arranged in the frame sealant arrangement area L1, so that both the annular groove 302 and the arc-shaped groove 303 can be covered by the sealant 61 subsequently formed on the display substrate, and double protection is achieved, which better solves the problem of relatively high risk of reliability evaluation and testing of the display substrate. Furthermore, the provision of the sealant 61 can completely cover the annular groove 302 and the arc-shaped groove 303, and can increase the contact area between the sealant 61 and the display substrate, so that the sealant 61 is more tightly bonded to the display substrate.

The display device provided by the embodiments of the present disclosure also has the above-described advantageous effects when including the above-described display substrate, and will not be described in detail herein.

As shown in FIGS. 3 to 8, in some embodiments, the display device further comprises a color film substrate 60 and a sealant 61, wherein the color film substrate 60 is arranged opposite to the display substrate, and the sealant 61 is located between the color film substrate 60 and the display substrate and is located in a frame sealant arrangement area L1 of the display substrate.

Illustratively, the display device further includes a liquid crystal layer between the display substrate and the color film substrate 60.

It is to be noted that the "same layer" in the embodiments of the present disclosure may refer to a film layer on the same structural layer. Or, for example, the film layer in the same layer may be a layer structure formed by forming a film layer for forming a specific pattern using the same film forming process and then patterning the film layer by one patterning process using the same mask plate. Depending on the particular pattern, a single patterning process may include multiple exposure, development, or etching processes, and the particular pattern in the resulting layer structure may or may not be continuous. The particular patterns may also be at different heights or have different thicknesses.

In the various method embodiments of the present disclosure, the serial number of each step cannot be used to define the order of each step, and for a person of ordinary skill in the art, without involving any inventive effort, changes in the order of each step are also within the scope of the present disclosure.

It should be noted that the various embodiments described herein are described in a progressive manner with reference to the same or similar parts throughout the various embodiments, with each embodiment focusing on differences from the other embodiments. In particular, the method embodiments are described more simply because they are substantially similar to the product embodiments, with reference to the partial description of the product embodiments.

Unless defined otherwise, technical or scientific terms used in this disclosure shall have the ordinary meaning as understood by one of ordinary skill in the art to which this disclosure belongs. The terms "first", "second", and the like as use herein do not denote any order, quantity, or importance, but rather are used to distinguish one element from another. The terms "comprising" or "comprises", and the like, means that the presence of an element or item preceding the word covers the presence of the element or item listed after the word and equivalents thereof, but does not exclude other elements or items. The terms "connecting", "coupling" or "connected" and the like are not limited to physical or mechanical connections, but may include electrical connections, whether direct or indirect. The terms "upper", "lower". "left", "right" and the like are used only to indicate relative positional relationships that may change accordingly when the absolute position of the object being described changes.

It will be understood that when an element such as a layer, film, region or substrate is referred to as being "on" or "under" another element, it can be "directly on" or "directly under" the other element or intervening elements may be present.

In the description of the embodiments above, particular features, structures, materials, or characteristics may be combined in any suitable manner in any one or more embodiments or examples.

While the present disclosure has been described with reference to specific embodiments thereof, it will be understood by those skilled in the art that various changes may be made and equivalents may be substituted for elements thereof without departing from the scope of the disclosure. Accordingly, the protection sought herein is as set forth in the claims below.

What is claimed is:

1. A display substrate, comprising: a display area and a frame area located at the periphery of the display area, wherein the frame area comprises a frame sealant arrangement area, and the frame sealant arrangement area comprises a corner area; the display substrate further comprising:
    an organic film layer, wherein the organic film layer comprises an annular groove and at least one arc-shaped groove, the annular groove surrounds the display area, and the annular groove is located in the frame sealant arrangement area; the arc-shaped groove is located in the corner area.

2. The display substrate according to claim 1, wherein the at least one arc-shaped groove is located between the anular groove and the display area.

3. The display substrate according to claim 2, wherein the organic film layer comprises a plurality of arc-shaped grooves, the plurality of arc-shaped grooves are divided into a plurality of groups of arc-shaped grooves, each group of arc-shaped grooves comprises at least two arc-shaped grooves, and the at least two arc-shaped grooves are sequentially arranged in a direction close to the display area; the plurality groups of arc-shaped groove groups are located in a plurality of corner areas comprised in the frame sealant arrangement area on a one-to-one basis.

4. The display substrate according to claim 1, wherein the organic film layer is located away from a boundary of the display area, and is located between a boundary of the frame sealant arrangement area away from the display area and the display area.

5. The display substrate according to claim 4, wherein a first distance is provided between an orthographic projection of a boundary of the organic film layer away from the display area on a base substrate of the display substrate and an orthographic projection of a boundary of the frame sealant arrangement area away from the display area on the base substrate of the display substrate, wherein the first distance d1 satisfies: d1=10%*d2±0.1, and d2 is the width of the frame sealant arrangement area.

6. The display substrate according to claim 1, wherein the display substrate further comprises a ground line located in the frame area, and the ground line surrounds the display area;
    an orthographic projection of the ground line on the base substrate of the display substrate at least partially overlaps with an orthographic projection of the annular groove on the base substrate; and/or,
    an orthographic projection of the ground line on the base substrate of the display substrate at least partially overlaps with an orthographic projection of the arc-shaped groove on the base substrate.

7. The display substrate according to claim 6, wherein an orthographic projection of the ground line on the base substrate of the display substrate at least partially overlaps with an orthographic projection of at least one end of the arc-shaped groove on the base substrate.

8. The display substrate according to claim 6, wherein the display substrate further comprises a common signal line located in the frame area, wherein an orthographic projection of the common signal line on the base substrate is located between the orthographic projection of the ground line on the base substrate and the display area;
    an orthographic projection of the common signal line on the base substrate does not overlap with the orthographic projection of the annular groove on the base substrate; and/or the orthographic projection of the common signal line on the base substrate at least partially overlaps with an orthographic projection of an end of the arc-shaped groove on the base substrate.

9. The display substrate according to claim 6, wherein
    at least a portion of the orthographic projection of the common signal line on the base substrate is between orthographic projections of adjacent arc-shaped grooves on the base substrate.

10. The display substrate according to claim 1, wherein the display substrate further comprises a data line testing circuit located in the frame area, and a plurality of data testing lines respectively connected to the data line testing circuit; and
    an orthographic projection of the data testing line on the base substrate of the display substrate at least partially overlaps with the orthographic projection of the annular groove on the base substrate.

11. The display substrate according to claim 10, wherein the orthographic projection of the data testing line on the base substrate of the display substrate at least partially overlaps with the orthographic projection of the arc-shaped groove on the base substrate.

12. The display substrate according to claim 1, wherein the display substrate further comprises a gate electrode driving circuit located in the frame area, and pulse signal lines respectively coupled to the gate electrode driving circuit;
    an orthographic projection of the pulse signal line on the base substrate of the display substrate does not overlap with the orthographic projection of the annular groove on the base substrate; and/or the orthographic projection of the pulse signal line on the base substrate of the display substrate does not overlap with the orthographic projection of the arc-shaped groove on the base substrate.

13. The display substrate according to claim 1, wherein the display substrate further comprises a data line layer, a first passivation layer, a first electrode layer and a second passivation layer which are successively stacked in a direction away from the base substrate of the display substrate, and the organic film layer is located between the first passivation layer and the first electrode layer.

14. A display device comprising the display substrate according to claim 1.

15. The display device according to claim 14, wherein the display device further comprises a color film substrate and a sealant, wherein the color film substrate is arranged opposite to the display substrate, and the sealant is located between the color film substrate and the display substrate and is located in the frame sealant arrangement area of the display substrate.

* * * * *